US012085458B2

(12) United States Patent
Liang et al.

(10) Patent No.: US 12,085,458 B2
(45) Date of Patent: Sep. 10, 2024

(54) TEMPERATURE SENSOR PROBE

(71) Applicant: Therm-O-Disc Incorporated, Mansfield, OH (US)

(72) Inventors: Guokuan Liang, Guangdong (CN); Xiaojian Wang, Guangdong (CN); Wenjie Wu, Guangdong (CN); Xiao Liu, Zhuhai (CN)

(73) Assignee: Therm-O-Disc, Incorporated, Mansfield, OH (US)

( * ) Notice: Subject to any disclaimer, the term of this patent is extended or adjusted under 35 U.S.C. 154(b) by 611 days.

(21) Appl. No.: 17/367,846

(22) Filed: Jul. 6, 2021

(65) Prior Publication Data
US 2022/0357216 A1 Nov. 10, 2022

(30) Foreign Application Priority Data
May 8, 2021 (CN) .......................... 202110500367.X

(51) Int. Cl.
*G01K 7/22* (2006.01)
*G01K 1/08* (2021.01)
(Continued)

(52) U.S. Cl.
CPC ............... *G01K 7/223* (2013.01); *G01K 1/08* (2013.01); *G01K 1/16* (2013.01); *G01K 7/24* (2013.01)

(58) Field of Classification Search
CPC ............ G01K 7/223; G01K 1/08; G01K 1/16; G01K 7/24
See application file for complete search history.

(56) References Cited

U.S. PATENT DOCUMENTS 2,973,495 A  2/1961 Greenberg
7,128,467 B2  10/2006 Philip et al.
(Continued)

FOREIGN PATENT DOCUMENTS

CN  1192224 C  3/2005
CN  203259264 U  10/2013
(Continued)

OTHER PUBLICATIONS

International Search Report and Written Opinion of the ISA for PCT/US2022/027808, ISA/EPO, mailed Aug. 16, 2022.

*Primary Examiner* — Mirellys Jagan
(74) *Attorney, Agent, or Firm* — Harness, Dickey & Pierce, P.L.C.

(57) ABSTRACT

A temperature sensor including a body made from a thermally and electrically conductive material, the body defined by a peripheral wall extending along a longitudinal axis from an open proximal end to a closed distal end. The proximal end defining an opening to an internal cavity of the body. A thermally responsive element including an outer surface, a temperature sensitive resistor electrically connected to a first lead, a second lead, and a connector block disposed substantially within the internal cavity. The inner surface of the peripheral wall defines the shape of a right circular cone at the distal end. The outer surface of the temperature sensitive resistor is in direct contact with the inner surface of the peripheral wall at the distal end. One of a thermally conductive and curable potting material and a thermally conductive grease disposed in the cavity and substantially surrounding the temperature responsive element.

20 Claims, 13 Drawing Sheets

(51) Int. Cl.
*G01K 1/16* (2006.01)
*G01K 7/24* (2006.01)

(56) References Cited

U.S. PATENT DOCUMENTS

| | | |
|---|---|---|
| 7,553,078 B2 | 6/2009 | Hanzawa et al. |
| 10,054,492 B2 | 8/2018 | Shiraki et al. |
| 2006/0222051 A1 * | 10/2006 | Rund .................. G01K 1/16 |
| | | 374/208 |
| 2016/0258818 A1 | 9/2016 | Ihle et al. |
| 2016/0320242 A1 | 11/2016 | Bernardi |

FOREIGN PATENT DOCUMENTS

| | | | | |
|---|---|---|---|---|
| CN | 105258820 A | | 1/2016 | |
| CN | 107449518 A * | | 12/2017 | ............. G01K 1/08 |
| CN | 109781295 A | | 5/2019 | |
| EP | 0691705 B1 | | 9/2002 | |
| FR | 3003945 A1 * | | 10/2014 | ............. G01K 1/08 |
| JP | 5263234 B2 | | 8/2013 | |
| WO | WO-2013073240 A1 * | | 5/2013 | ............ G01K 7/223 |
| WO | 2019082618 A1 | | 5/2019 | |
| WO | 2021/209619 A1 | | 10/2021 | |

* cited by examiner

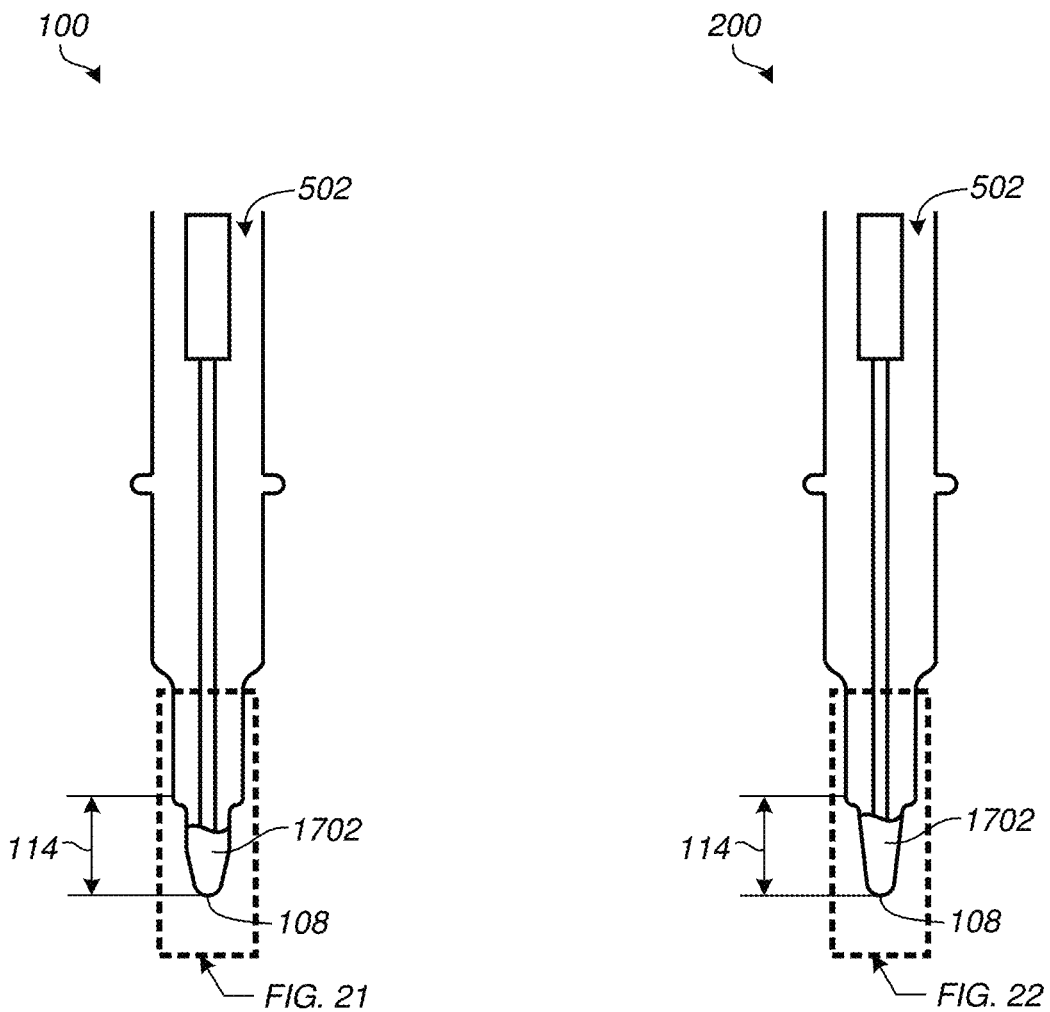

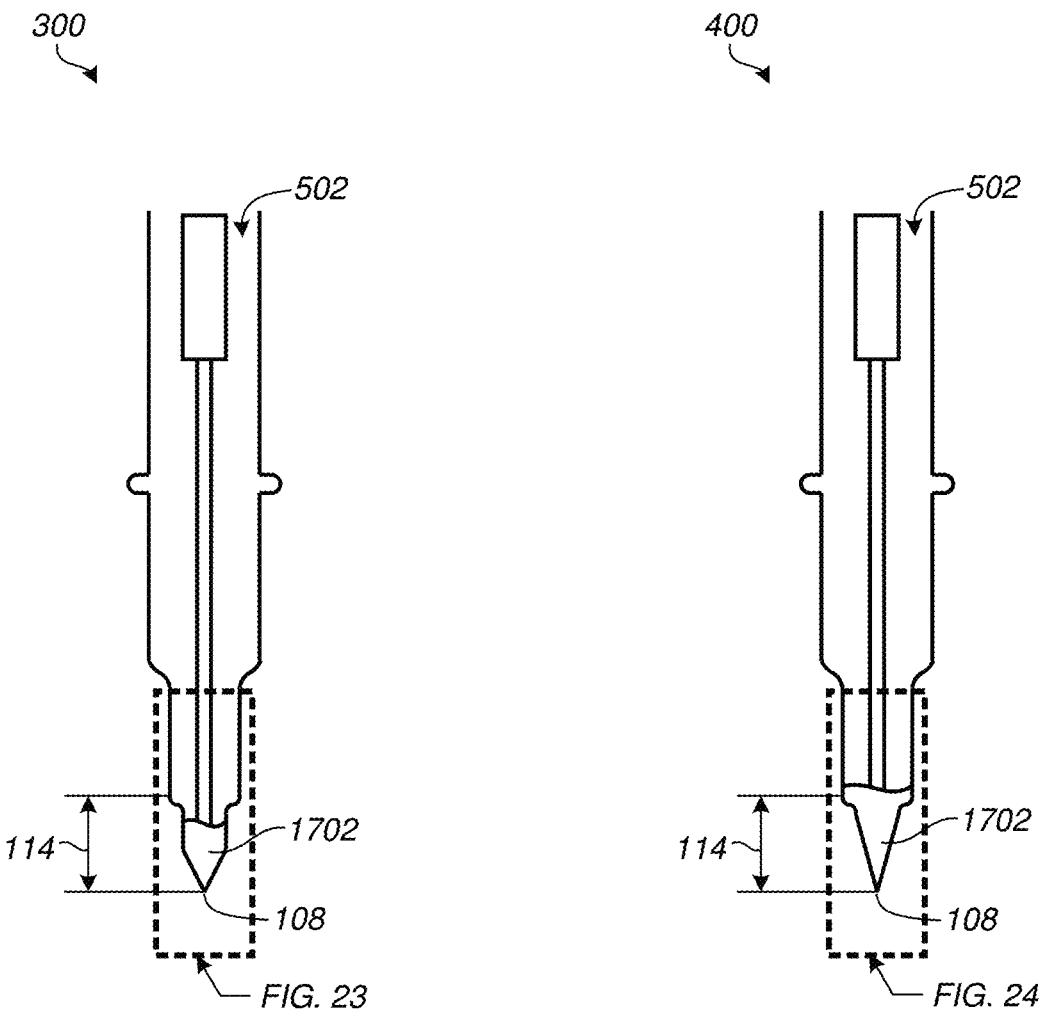

TEMPERATURE SENSOR PROBE

CROSS-REFERENCE TO RELATED APPLICATIONS

This application claims the benefit and priority of Chinese Patent Application No. 202110500367X, filed May 8, 2021. The entire disclosure of the above application is incorporated herein by reference.

FIELD

The present disclosure relates generally to sensors and more particularly, but without limitation, to sensors having a thermistor positioned within a tubular probe.

BACKGROUND

This section provides background information related to the present disclosure which is not necessarily prior art.

Thermistors are commonly used for sensing temperatures in household appliance and industrial applications. Generally, thermistors are a type of resistor whose resistance changes significantly responsive to changes in the temperature of the resistor. Commonly, negative temperature coefficient (NTC) thermistors may be made from materials such as highly-sensitive metal oxide. With NTC thermistors, as the temperature of the thermistor increases, the valence electrons of the metal oxide material becomes more active, reducing the resistance of the thermistor. In order to protect the thermistor, they are commonly encapsulated in a thermally conductive material such as thermally conductive epoxy, ceramic, glass, or other suitable material. The encapsulated thermistor and lead wires may be further placed within a protective housing, such as within a tubular probe formed of thermally conductive material.

In an encapsulated thermistor positioned within a protective housing, the responsiveness of the thermistor may be affected by characteristics of the material used to encapsulate the thermistor, characteristics of the material used to form the housing, as well as the contact between the encapsulating material and the housing material itself. In order to improve the responsiveness of an encapsulated thermistor disposed within a protective housing to changes in temperatures outside of the protective housing, it may be desirable to improve the overall rate of heat flow from the outside of the protective housing to the thermistor. One way to improve the overall rate of heat flow is to increase the surface area of material used to encapsulate the thermistor that is in direct contact with the housing material, increasing the transfer of thermal energy through conduction. Thus, there is the need to provide improved protective housings for use with temperature sensors such as thermistors.

SUMMARY

This section provides a general summary of the disclosure, and is not a comprehensive disclosure of its full scope or all of its features.

New and useful systems, apparatuses, and methods for temperature sensors are set forth in the appended claims. Illustrative embodiments are also provided to enable a person skilled in the art to make and use the claimed subject matter.

For example, a temperature sensor is presented. The temperature sensor may include a body made from a thermally and electrically conductive material. The body may be defined by a peripheral wall extending along a longitudinal axis from an open proximal end to a closed distal end. At the proximal end of the body, the peripheral wall may define an opening to an internal cavity of the body. The internal cavity may be bounded by an inner surface of the peripheral wall. A temperature responsive element may be disposed substantially within the internal cavity. The temperature response element may have an outer surface, a temperature sensitive resistor, a first lead, a second lead, and a connector block. A first end of the first lead may be electrically connected to a first side of the connector block, and a second end of the first lead may be electrically connected to a first side of the resistor. A first end of the second lead may be electrically connected to a second side of the connector block, and a second end of the second lead may be electrically connected to a second side of the resistor. A continuous electrical circuit may be formed between the first side of the connector block, to the first lead, to the resistor, to the second lead, and to the second side of the connector block. At the closed distal end of the body, the inner surface of the peripheral wall may have the shape of a right circular cone. The outer surface of the temperature sensitive resistor may be in direct contact with at least three points on the inner surface of the peripheral wall at the distal end of the body. At least two of the at least three points may be separated by at least 90 degrees as measured along a perimeter of the peripheral wall defined perpendicular to the longitudinal axis. One of the thermally conductive and curable potting material and a thermally conductive grease may be disposed in the cavity and substantially surround the temperature responsive element.

In some examples, a cross-section of the cone taken along the longitudinal axis may have an included angle θ. In some examples, θ may be in a range of about 15° to about 120°. In some examples, θ may be in a range of about 30° to about 90°. In some examples, an apex angle of the cone θ may be in a range of about 15° to about 120°. In some examples, an apex angle of the cone θ may be in a range of about 30° to about 90°. In some examples, a vertex of the cone may have a radius. For example, the vertex of the cone may be a hemisphere.

More generally, a temperature sensor having a body defined by a peripheral wall extending along a longitudinal axis from an open proximal end to a closed distal end is presented. At the proximal end of the body, the peripheral wall may define an opening to an internal cavity of the body. The internal cavity may be bounded by an inner surface of the peripheral wall. A temperature responsive element may be disposed substantially within the internal cavity. The temperature responsive element may have an outer surface. At the closed distal end of the body, the inner surface of the peripheral wall may be a cone. The outer surface of the temperature responsive element may be in direct contact with at least two points on the inner surface of the peripheral wall at the closed distal end of the body. The at least two points may be separated by at least 90 degrees as measured in a plane perpendicular to the longitudinal axis.

In some examples, the cone may be a right circular cone. In some examples, a cross-section of the cone taken along the longitudinal axis may have an included angle θ. In some examples, θ may be in a range of about 15° to about 120°. An apex angle of the cone θ may be in a range of about 30° to about 90°. In some examples, a vertex of the cone may include a radius. For example, the vertex of the cone may include a hemisphere. In some examples, the body may include an electrically conductive material. In some examples, the body may include a thermally conductive material and an electrically conductive material. In some examples, the body may include at least one of steel, aluminum, copper, brass, and stainless steel.

In some examples, the temperature responsive element may include a temperature sensitive resistor, a first lead, a second lead, and a connector block. A first end of the first lead may be electrically connected to a first end of the connector block, and a second end of the first lead may be electrically connected to a first side of the resistor. A first end of the second lead may be electrically connected to a second side of the connector block, and a second end of the second lead may be electrically connected to a second side of the resistor. A continuous electrical circuit may be formed between the first side of the connector block, to the first lead, to the resistor, to the second lead, and to the second side of the connector block.

In some examples, a thermally conductive and curable potting material may be disposed in the cavity and substantially surround the temperature responsive element. In some examples, a curable dielectric material may be disposed in the cavity and substantially surround the temperature responsive element. In some examples, a thermally conductive grease may be disposed in the cavity and substantially surround the temperature responsive element.

Objectives, advantages, and a preferred mode of making and using the claimed subject matter may be understood best by reference to the accompanying drawings in conjunction with the following detailed description of illustrative embodiments.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 17 is a cross-sectional view, illustrating additional details that may be associated with some examples of the temperature sensor of FIG. 5;

FIG. 18 is a cross-sectional view, illustrating additional details that may be associated with some examples of the temperature sensor of FIG. 6;

FIG. 19 is a cross-sectional view, illustrating additional details that may be associated with some examples of the temperature sensor of FIG. 7;

FIG. 20 is a cross-sectional view, illustrating additional details that may be associated with some examples of the temperature sensor of FIG. 8;

Corresponding reference numerals indicate corresponding parts throughout the several views of the drawings.

DETAILED DESCRIPTION

Example embodiments will now be described more fully with reference to the accompanying drawings.

The following description of example embodiments provides information that enables a person skilled in the art to make and use the subject matter set forth in the appended claims, but it may omit certain details already well-known in the art. The following detailed description is, therefore, to be taken as illustrative and not limiting.

Figure 1:
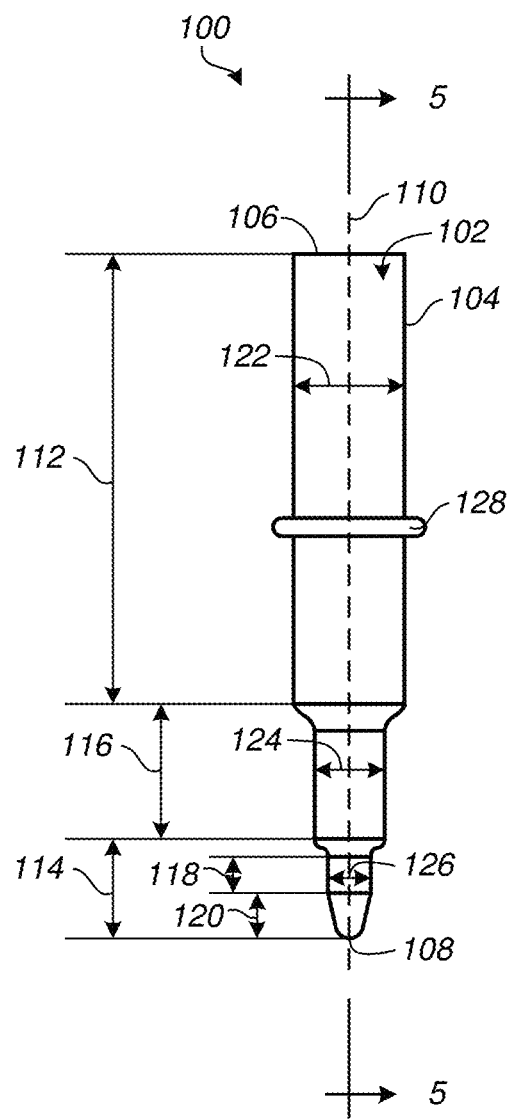
FIG. 1 is a front view of a temperature sensor in accordance with this specification.

FIG. 1 is a front view of a temperature sensor 100 in accordance with this specification. As shown in FIG. 1, some examples of the temperature sensor 100 include a protective exterior housing, such as housing 102. In some examples, the body of the housing 102 may be formed from a single piece of material. In some embodiments, the body of the housing 102 may be formed from multiple pieces of materials. In some examples, the body of the housing 102 may be formed from an electrically conductive material. In some examples, the body of the housing 102 may be formed from a thermally conductive material. For example, the body of the housing 102 may be formed from a metallic material, such as iron, steel, stainless steel, brass, copper, or aluminum. According to some examples, the housing 102 may be formed from a peripheral wall 104 extending from a proximal end 106 to a distal end 108. The peripheral wall may 104 be substantially radially symmetric about an axis 110 extending from a center of the housing 102 at the proximal end 106 to a center of the housing 102 at the distal end 108. The housing 102 may have an open or substantially open proximal end 106, and a closed or substantially closed distal end 108. In some examples, the housing 102 may include a first portion 112 extending a distance from the proximal end 106 towards the distal end 108, a second portion 114 extending a distance from the distal end 108 towards the proximal end 106, and a third portion 116 between the first portion 112 and the second portion 114. In some examples, the second portion 114 may include a base portion 118 proximate the third portion 116, and a tip portion 120 proximate the distal end 108.

As illustrated in the example of FIG. 1, some embodiments of the tip portion 120 may define a rounded cone, or a truncated cone with a spherical or hemispherical cap at the apex or vertex of the cone. For example, the inner surface of the peripheral wall 104 at the tip portion 120 may define a cone. In some examples, the outer surface of the peripheral wall 104 at the tip portion 120 may define a cone. The first portion 112 may have a width or a diameter as measured in a directional substantially orthogonal to the axis 110 defined by a length 122. The third portion 116 may have a width or a diameter as measured in a direction substantially orthogonal to the axis 110 defined by a length 124. The base portion 118 may have a width or a diameter as measured in a direction substantially orthogonal to the axis 110 defined by a length 126. In some examples, an annular ridge or protrusion 128 may be formed on the peripheral wall 104 at the first portion 112. In some embodiments, the peripheral wall 104 may have a thickness of about 0.2 millimeters. According to some examples, the first portion 112 may be about 24.2 millimeters in length, the second portion 114 may be about 3.5 millimeters in length, and the third portion may be about 4.7 millimeters in length. In some examples, the length 122 may be about 5.5 millimeters, the length 124 may be about 2.5 millimeters, and the length 126 may be about 2 millimeters.

Figure 2:
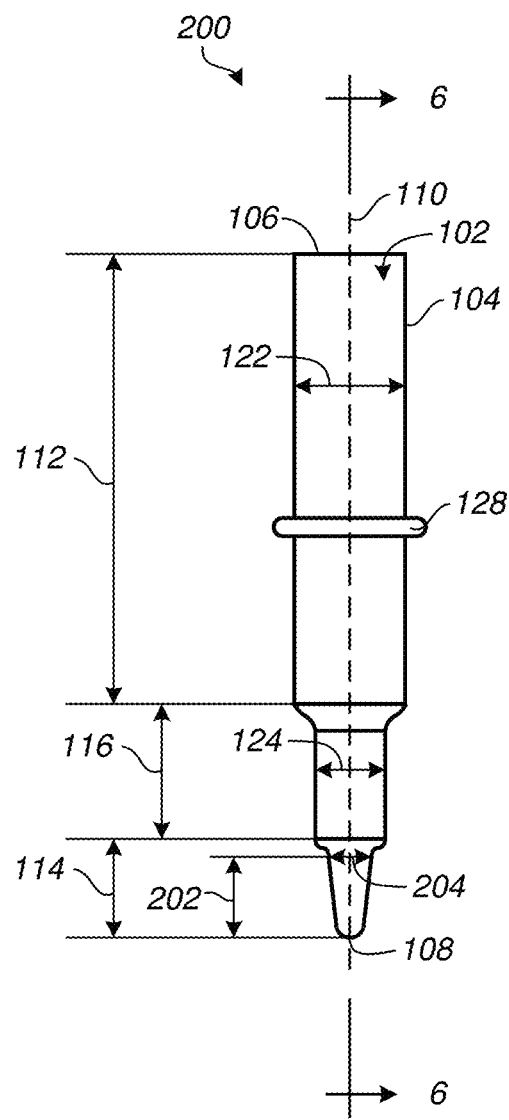
FIG. 2 is a front view of a temperature sensor in accordance with this specification.

FIG. 2 is a front view of a temperature sensor 200 in accordance with this specification. The temperature sensor 200 may be substantially similar to the temperature sensor 100 of FIG. 1, with the exception that the base portion 118 of the temperature sensor 100 may be omitted. As illustrated in FIG. 2, the tip portion 202 of the temperature sensor 200 may extend a substantial distance from the distal end 108 towards the third portion 116. For example, the tip portion 202 of the temperature sensor 200 may extend a same distance from the distal end 108 towards the third portion as the combined lengths of the base portion 118 and tip portion 120 of the temperature sensor 100 as measured along the axis 110. Some embodiments of the tip portion 202 may define a rounded cone, or a truncated cone with a spherical cap at the apex or vertex. The base of the tip portion 204 may be defined as the part of the tip portion 204 most distal from the distal end 108. The base of the tip portion 204 may have a width or a diameter as measured in a direction substantially orthogonal to the axis 110 may be defined by a length 204. In some examples, the length 204 may be about 2 millimeters.

Figure 3:
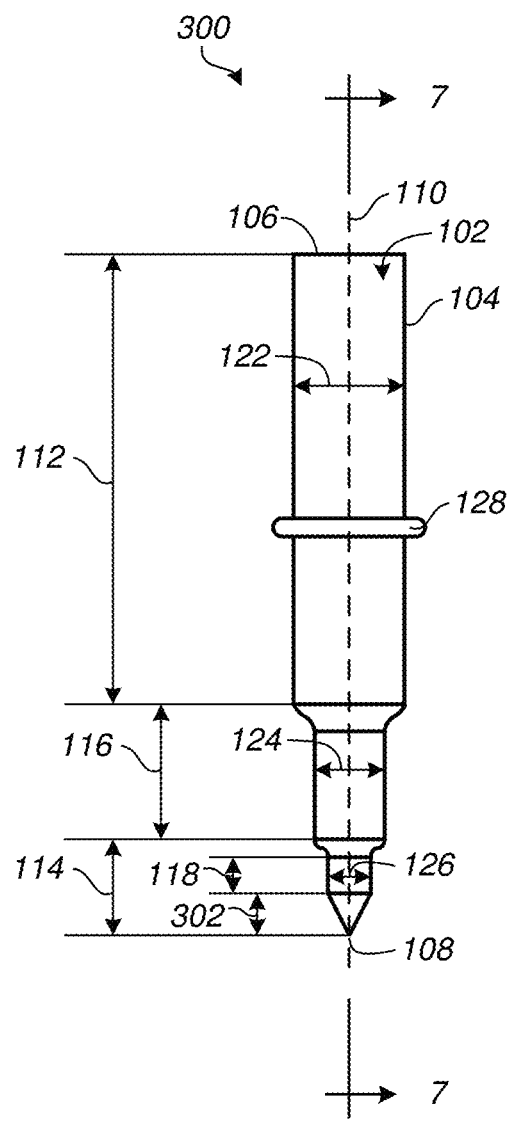
FIG. 3 is a front view of a temperature sensor in accordance with this specification.

FIG. 3 is a front view of a temperature sensor 300 in accordance with this specification. The temperature sensor 300 may be substantially similar to the temperature sensor 100 of FIG. 1, with the exception that the tip portion 302, which is analogous to the tip portion 120, may define a cone, such as a right circular cone which tapers to a point at the apex or vertex of the cone.

Figure 4:
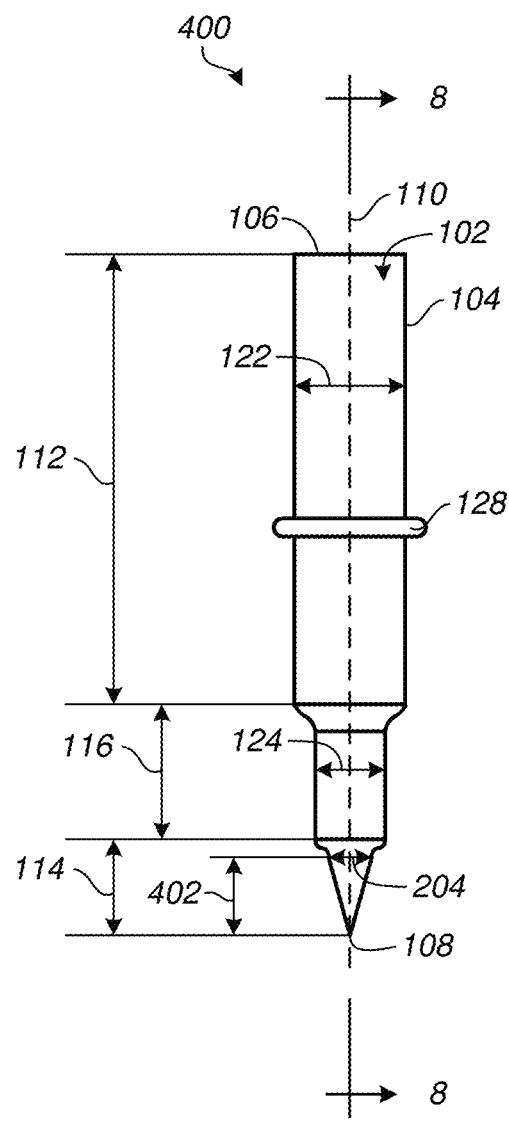
FIG. 4 is a front view of a temperature sensor in accordance with this specification.

FIG. 4 is a front view of a temperature sensor 400 in accordance with this specification. The temperature sensor 400 may be substantially similar to the temperature sensor 200 of FIG. 2, with the exception that the tip portion 402, which is analogous to the tip portion 202, may define a cone, such as a right circular cone which tapers to a point at the apex or vertex of the cone.

Figure 5:
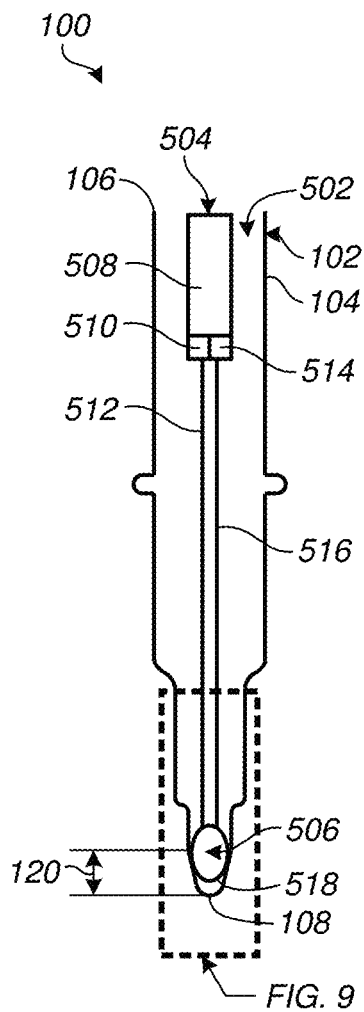
FIG. 5 is a cross-sectional view of the example temperature sensor of FIG. 1, taken at line 5-5 of FIG. 1.

FIG. 5 is a cross-sectional view of the example temperature sensor 100 of FIG. 1, taken at line 5-5 of FIG. 1. As illustrated in FIG. 5, the peripheral wall 104 of the housing 102 may define a cavity 502 having an opening at the proximal end 106. A temperature responsive element, such as a temperature sensing unit 504 may be disposed substantially within the cavity 502. In some examples, the temperature sensing unit 504 may include a temperature sensitive element, such as the temperature sensitive resistor unit 506. The temperature sensitive resistor unit 506 may include a thermally sensitive resistor that exhibits a change in electrical resistance with a change in its temperature, such as a thermistor which may be obtained from Therm-O-Disc, Incorporated of Mansfield, Ohio. The thermistor of the thermally sensitive resistor unit 506 may be operatively coupled to a connecting block 508. For example, a first side of the thermistor of the thermally sensitive resistor unit 506 may be electrically connected to a first side 510 of the connecting block 508 via a first line or lead, such as wire 512, and a second side of the thermistor of the thermally sensitive resistor unit 506 may be electrically connected to a second side 514 of the connecting block 504 via a second line or lead, such as wire 516. Accordingly, the thermistor of the thermally sensitive resistor unit 506, wire 512, connecting block 504, and wire 516 may form a continuous electrical circuit. In some examples, the thermally sensitive resistor unit 506 may include an outer surface 518. In some examples, at least a portion of the outer surface 518 of the thermally sensitive resistor unit 506 may be disposed within the cavity 502 to be in physical contact with at least a portion of an interior surface of the peripheral wall 104 near the apex or vertex of the cone of the tip portion 120.

Figure 6:
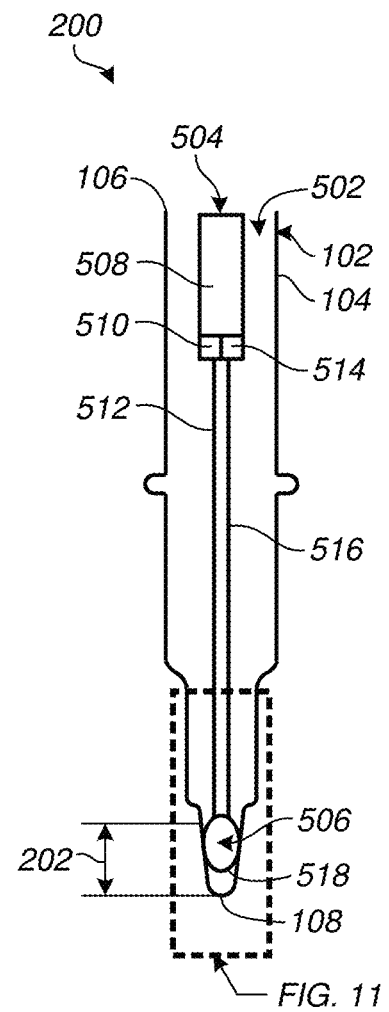
FIG. 6 is a cross-sectional view of the example temperature sensor of FIG. 2, taken at line 6-6 of FIG. 2.

FIG. 6 is a cross-sectional view of the example temperature sensor 200 of FIG. 2, taken at line 6-6 of FIG. 2. The temperature sensor 200 of FIG. 7 may be substantially similar to the temperature sensor 100 of FIG. 5, with the exception that in some examples, at least a portion of the outer surface 518 of the thermally sensitive resistor unit 506 may be disposed within the cavity 502 to be in physical contact with at least a portion of an interior surface of the peripheral wall 104 near the apex or vertex of the cone of the tip portion 202.

Figure 7:
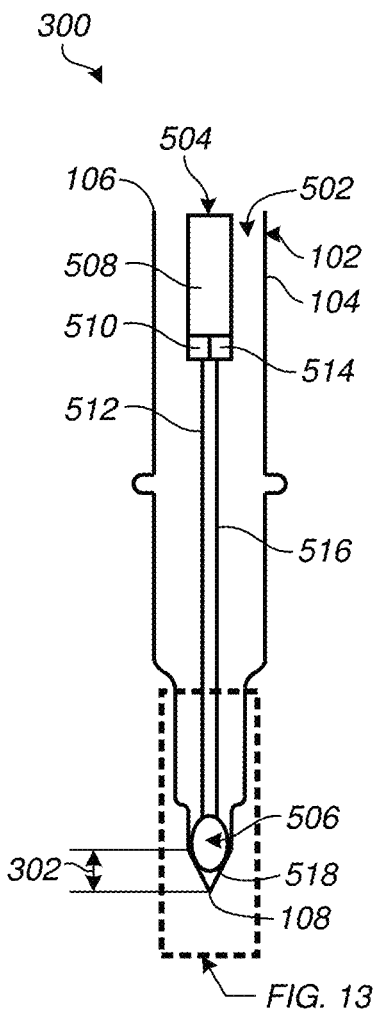
FIG. 7 is a cross-sectional view of the example temperature sensor of FIG. 3, taken at line 7-7 of FIG. 3.

FIG. 7 is a cross-sectional view of the example temperature sensor 300 of FIG. 3, taken at line 7-7 of FIG. 3. The temperature sensor 300 of FIG. 7 may be substantially similar to the temperature sensor 100 of FIG. 5, with the exception that in some examples, at least a portion of the outer surface 518 of the thermally sensitive resistor unit 506 may be disposed within the cavity 502 to be in physical contact with at least a portion of an interior surface of the peripheral wall 104 near the apex or vertex of the cone of the tip portion 302.

Figure 8:
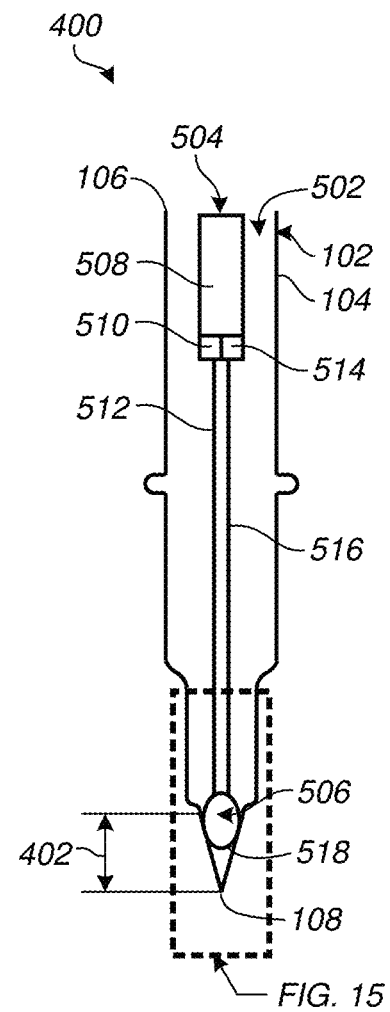
FIG. 8 is a cross-sectional view of the example temperature sensor of FIG. 4, taken at line 8-8 of FIG. 4.

FIG. 8 is a cross-sectional view of the example temperature sensor 400 of FIG. 4, taken at line 8-8 of FIG. 4. The temperature sensor 400 of FIG. 8 may be substantially similar to the temperature sensor 100 of FIG. 5, with the exception that in some examples, at least a portion of the outer surface 518 of the thermally sensitive resistor unit 506 may be disposed within the cavity 502 to be in physical contact with at least a portion of an interior surface of the peripheral wall 104 near the apex or vertex of the cone of the tip portion 402.

Figures 9, 10:
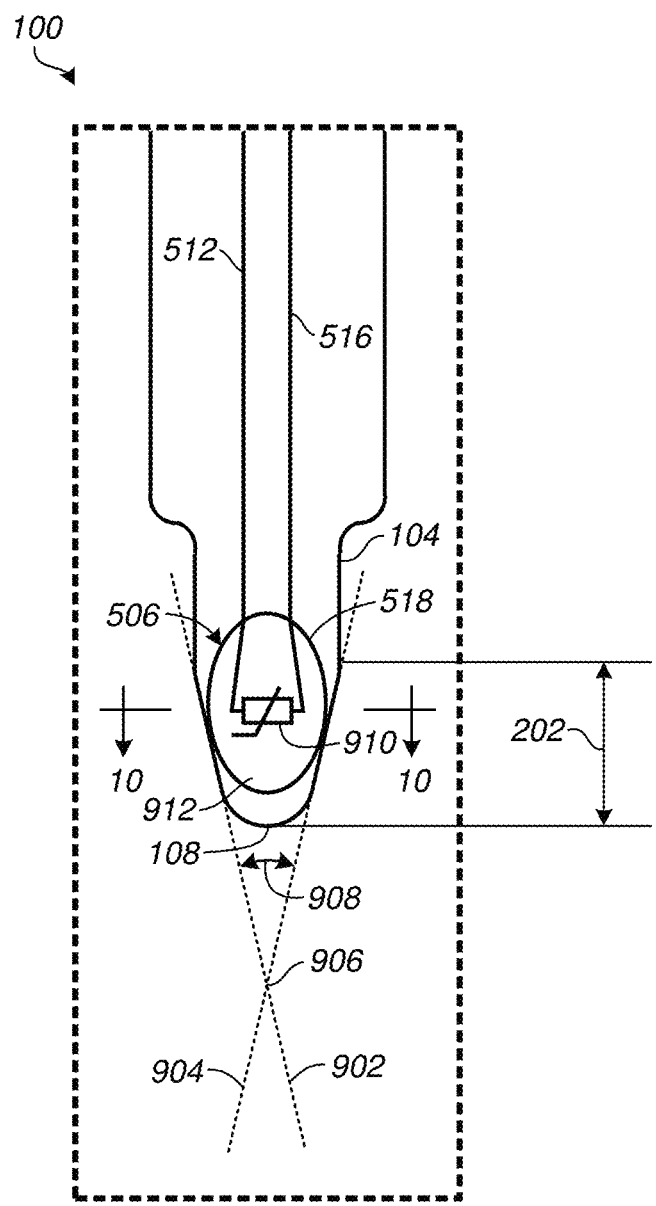
FIG. 9 is a detail view, taken at reference FIG. 9 in FIG. 5, illustrating details that may be associated with some example embodiments of the temperature sensor of FIG. 5.
FIG. 10 is a cross-sectional view of the example temperature sensor of FIG. 9, taken at line 10-10 of FIG. 9.

FIG. 9 is a detail view, taken at reference FIG. 9 in FIG. 5, illustrating details that may be associated with some example embodiments of the temperature sensor 100 of FIG. 5. As illustrated in FIG. 9, the tip portion 120 may define a cone, with a base closer to the proximate end 106, and an apex or vertex located closer to the distal end 108. Generally, the perimeter of the base of a cone is called the "directrix," and each of the line segments between the directrix and the apex or vertex is called a "generatrix" or "generating line." FIG. 9 illustrates a first generatrix line 902 and a second generatrix line 904 of the cone of the tip portion 120, intersecting at the apex or vertex 906 of the cone. Generally, the "aperture" of the cone is the maximum angle θ between two generatrix lines, and may also be referred to as the apex angle or vertex angle. For example, as shown in FIG. 9, angle θ may be an angle 908 formed between the first generatix line 902 and the second generatix line 904. In some examples, angle 908 may be in a range of about 15° and about 120°. In some examples, angle 908 may be in a range of about 30° and about 90°.

FIG. 9 illustrates additional details that may be associated with some example embodiments of the temperature sensitive resistor unit 506. As illustrated in FIG. 9, the temperature sensitive resistor unit 506 may include a thermistor 910. A first side of the thermistor 910 may be electrically connected to the wire 512, and a second side of the thermistor 910 may be electrically connected to the wire 516. In some examples, the thermistor 910 may be encapsulated within an encapsulating member 912, such as a thermally conductive bead. In some examples, the encapsulating member 912 may be a glass, ceramic, or epoxy bead. In some examples, an exterior surface of the encapsulating member 912 may form the outer surface 518 of the thermally sensitive resistor unit 506. As illustrated in FIG. 9, at least a portion of the outer surface 518 may be in contact with the interior surface of the portion of the peripheral wall 104 forming the cone of tip portion 120.

FIG. 10 is a cross-sectional view of the example temperature sensor 100 of FIG. 9, taken at line 10-10 of FIG. 9. As illustrated in FIG. 10, at least a portion of the outer surface 518 may be in contact with the interior surface of the portion of the peripheral wall 104 forming the cone of tip portion 120. For example, the outer surface 518 may be in contact with the interior surface of the peripheral wall 104 at a plurality of contact points 1002. In some examples, the outer surface 518 may be in contact with the interior surface of the peripheral wall at two or more contact points 1002. In some examples, the outer surface 518 may be in contact with the interior surface of the peripheral wall at three or more contact points 1002. As illustrated in FIG. 10, in some examples, at least two of the contact points 1002 may be separated by at least 90 degrees as measured along a perimeter of the peripheral wall 104 defined in a plane perpendicular to a longitudinal axis, such as axis 110. In some examples, there may be eight or more contact points 1002.

Figure 11:
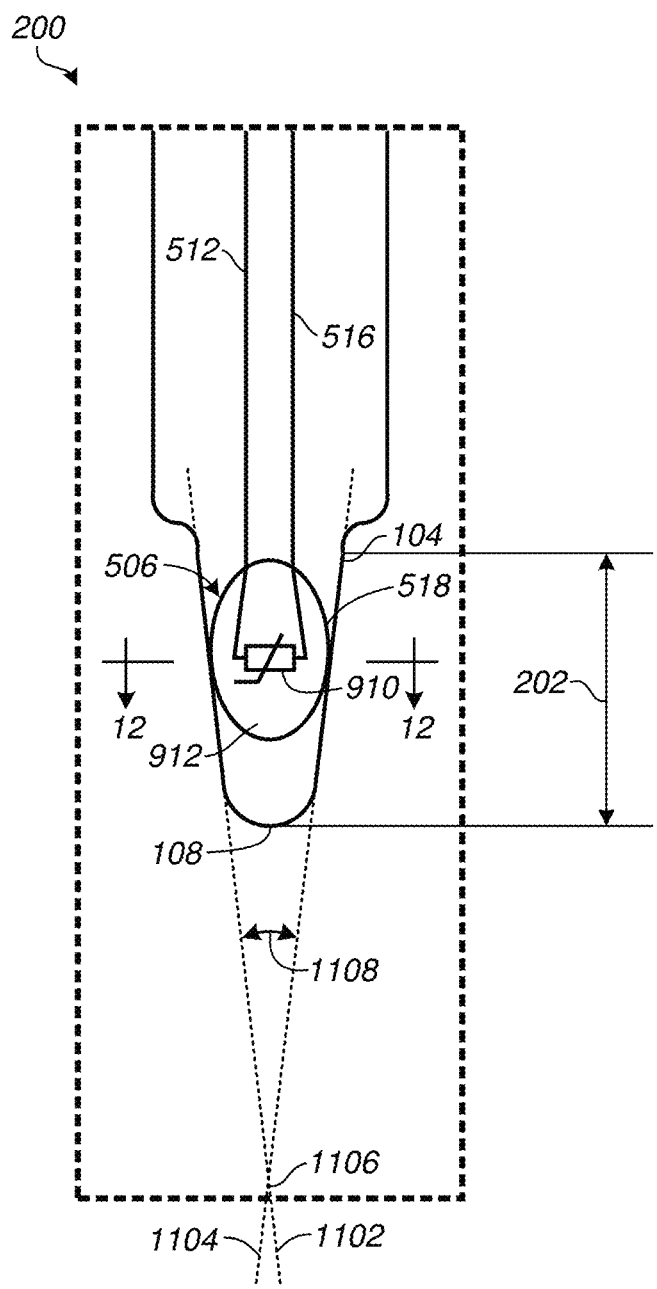
FIG. 11 is a detail view, taken at reference FIG. 11 in FIG. 6, illustrating details that may be associated with some example embodiments of the temperature sensor of FIG. 6.

FIG. 11 is a detail view, taken at reference FIG. 11 in FIG. 6, illustrating details that may be associated with some example embodiments of the temperature sensor 200 of FIG. 6. The temperature sensor 200 may be substantially similar to the temperature sensor 100 of FIG. 9, with the exception that a first generatrix line 1102 and a second generatrix line 1104 are formed by the cone of the tip portion 202. The first generatrix line 1102 and the second generatrix line 1104 may intersect at an apex or vertex 1106 of the cone. As shown in FIG. 11, the angle θ may be an angle 1108 formed between the first generatrix line 1102 and the second generatrix line 1104. In some examples, angle 1108 may be in a range of about 15° and about 120°. In some examples, angle 1108 may be in a range of about 30° and about 90°.

Figure 12:
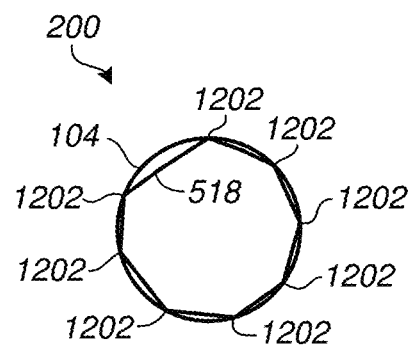
FIG. 12 is a cross-sectional view of the example temperature sensor of FIG. 11, taken at line 12-12 of FIG. 12.

FIG. 12 is a cross-sectional view of the example temperature sensor 200 of FIG. 11, taken at line 12-12 of FIG. 12. As illustrated in FIG. 12, at least a portion of the outer surface 518 may be in contact with the interior surface of the portion of the peripheral wall 104 forming the cone of tip portion 202. For example, the outer surface 518 may be in contact with the interior surface of the peripheral wall 104 at a plurality of contact points 1202. In some examples, the outer surface 518 may be in contact with the interior surface of the peripheral wall at two or more contact points 1202. In some examples, the outer surface 518 may be in contact with the interior surface of the peripheral wall at three or more contact points 1202. As illustrated in FIG. 12, in some examples, at least two of the contact points 1202 may be separated by at least 90 degrees as measured along a perimeter of the peripheral wall 104 defined in a plane perpendicular to a longitudinal axis, such as axis 110. In some examples, there may be eight or more contact points 1202.

Figure 13:
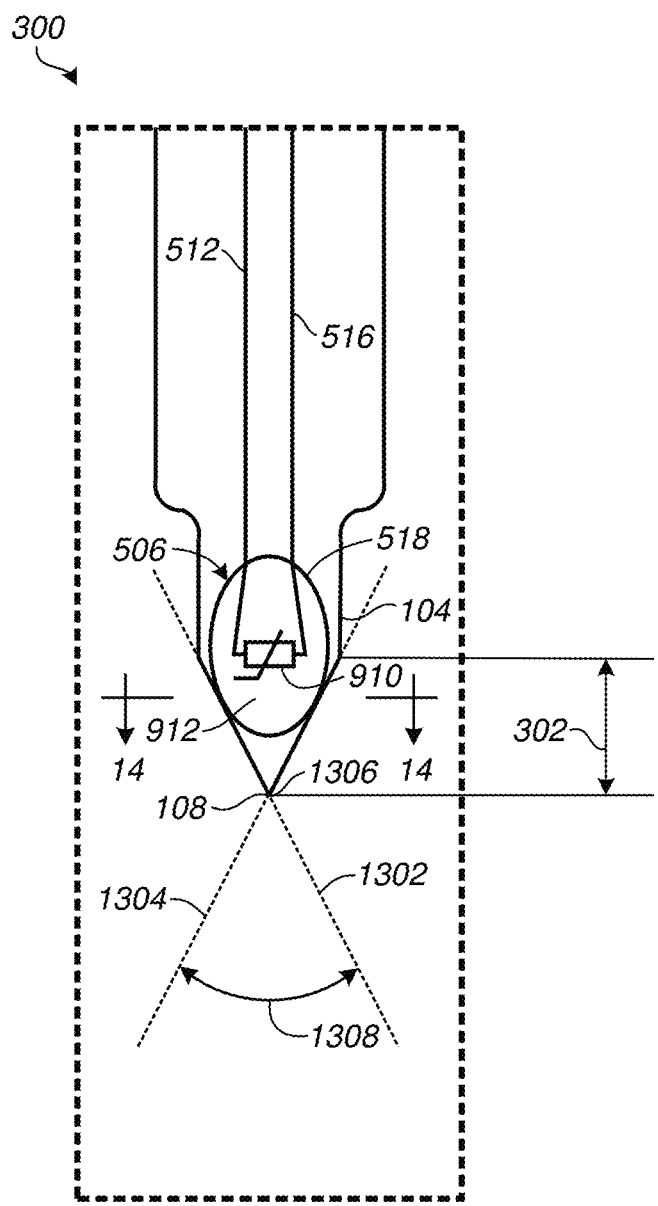
FIG. 13 is a detail view, taken at reference FIG. 13 in FIG. 7, illustrating details that may be associated with some example embodiments of the temperature sensor of FIG. 7.

FIG. 13 is a detail view, taken at reference FIG. 13 in FIG. 7, illustrating details that may be associated with some example embodiments of the temperature sensor 300 of FIG. 7. The temperature sensor 300 may be substantially similar to the temperature sensor 100 of FIG. 9, with the exception that a first generatrix line 1302 and a second generatrix line 1304 are formed by the cone of the tip portion 302. The first generatrix line 1302 and the second generatrix line 1304 may intersect at an apex or vertex 1306. In some examples, the apex or vertex 1306 may be collocated with the distal end 108. As shown in FIG. 13, the angle θ may be an angle 1308 formed between the first generatrix line 1302 and the second generatrix line 1304. In some examples, angle 1308 may be in a range of about 15° and about 120°. In some examples, angle 1308 may be in a range of about 30° and about 90°.

Figure 14:
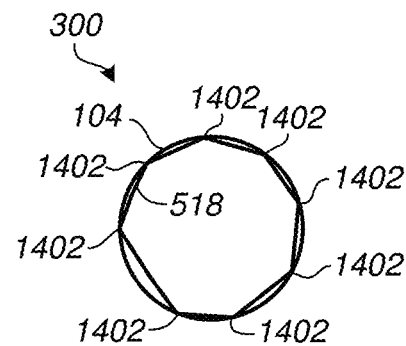
FIG. 14 is a cross-sectional view of the example temperature sensor of FIG. 11, taken at line 14-14 of FIG. 13.

FIG. 14 is a cross-sectional view of the example temperature sensor 200 of FIG. 11, taken at line 14-14 of FIG. 13. As illustrated in FIG. 14, at least a portion of the outer surface 518 may be in contact with the interior surface of the portion of the peripheral wall 104 forming the cone of tip portion 302. For example, the outer surface 518 may be in contact with the interior surface of the peripheral wall 104 at a plurality of contact points 1402. In some examples, the outer surface 518 may be in contact with the interior surface of the peripheral wall at two or more contact points 1402. In some examples, the outer surface 518 may be in contact with the interior surface of the peripheral wall at three or more contact points 1402. As illustrated in FIG. 14, in some examples, at least two of the contact points 1402 may be separated by at least 90 degrees as measured along a perimeter of the peripheral wall 104 defined in a plane perpendicular to a longitudinal axis, such as axis 110. In some examples, there may be eight or more contact points 1402.

Figure 15:
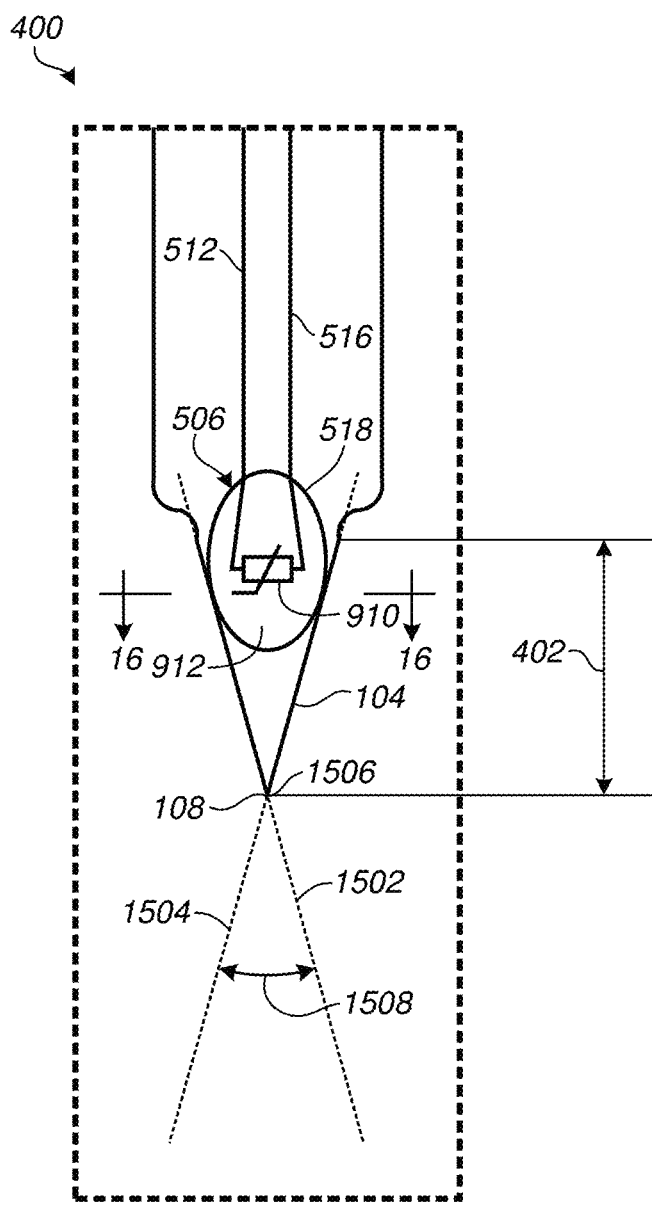
FIG. 15 is a detail view, taken at reference FIG. 15 in FIG. 8, illustrating details that may be associated with some example embodiments of the temperature sensor of FIG. 8.

FIG. 15 is a detail view, taken at reference FIG. 15 in FIG. 8, illustrating details that may be associated with some example embodiments of the temperature sensor 400 of FIG. 8. The temperature sensor 400 may be substantially similar to the temperature sensor 100 of FIG. 9, with the exception that a first generatrix line 1502 and a second generatrix line 1504 are formed by the cone of the tip portion 402. The first generatrix line 1502 and the second generatrix line 1504 may intersect at an apex or vertex 1506. In some examples, the apex or vertex 1506 may be collocated with the distal end 108. As shown in FIG. 15, the angle θ may be an angle 1508 formed between the first generatrix line 1502 and the second generatrix line 1504. In some examples, angle 1508 may be in a range of about 15° and about 120°. In some examples, angle 1508 may be in a range of about 30° and about 90°.

Figure 16:
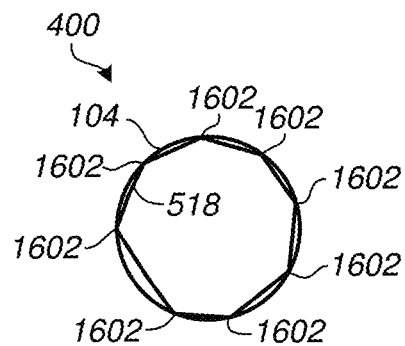
FIG. 16 is a cross-sectional view of the example temperature sensor of FIG. 15, taken at line 16-16 of FIG. 15.

FIG. 16 is a cross-sectional view of the example temperature sensor 400 of FIG. 15, taken at line 16-16 of FIG. 15. As illustrated in FIG. 16, at least a portion of the outer surface 518 may be in contact with the interior surface of the portion of the peripheral wall 104 forming the cone of tip portion 402. For example, the outer surface 518 may be in contact with the interior surface of the peripheral wall 104 at a plurality of contact points 1602. In some examples, the outer surface 518 may be in contact with the interior surface of the peripheral wall at two or more contact points 1602. In some examples, the outer surface 518 may be in contact with the interior surface of the peripheral wall at three or more contact points 1602. As illustrated in FIG. 14, in some examples, at least two of the contact points 1602 may be separated by at least 90 degrees as measured along a perimeter of the peripheral wall 104 defined in a plane perpendicular to a longitudinal axis, such as axis 110. In some examples, there may be eight or more contact points 1602.

FIG. 17 is a cross-sectional view, illustrating additional details that may be associated with some examples of the temperature sensor 100 of FIG. 5. As shown in FIG. 17, a potting or dielectric material 1702 may be disposed in the cavity 502. For dielectric material 1702 may fill a substantial portion of the second portion 114 near the distal end 108. In some examples, the dielectric material 1702 may include a thermally conductive base plastic material, such as epoxy. In some examples, the epoxy may be enhanced with additives. In some examples, the additives may be electrically isolative and yet have better thermal conductivity than that of the base plastic material. In some examples, the dielectric material 1702 may include a curable dielectric material. In some examples, the dielectric material may include a thermally conductive and curable potting material. In some examples, the dielectric material 1702 may include a thermally conductive grease.

FIG. 18 is a cross-sectional view, illustrating additional details that may be associated with some examples of the temperature sensor 200 of FIG. 6. As shown in FIG. 18, the potting or dielectric material 1702 may be disposed within the cavity 502 to fill a substantial portion of the second portion 114 of the temperature sensor 200 near the distal end 108.

FIG. 19 is a cross-sectional view, illustrating additional details that may be associated with some examples of the temperature sensor 300 of FIG. 7. As shown in FIG. 19, the potting or dielectric material 1702 may be disposed within the cavity 502 to fill a substantial portion of the second portion 114 of the temperature sensor 300 near the distal end 108.

FIG. 20 is a cross-sectional view, illustrating additional details that may be associated with some examples of the temperature sensor 400 of FIG. 8. As shown in FIG. 20, the potting or dielectric material 1702 may be disposed within the cavity 502 to fill a substantial portion of the second portion 114 of the temperature sensor 400 near the distal end 108.

Figure 21:
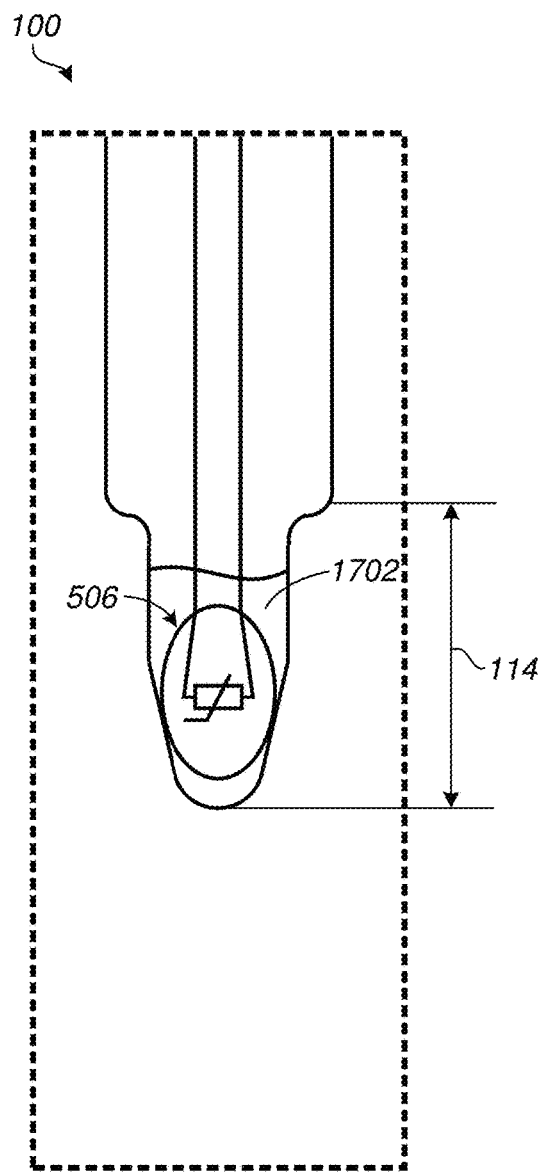
FIG. 21 is a detail view, taken at reference FIG. 21 of in FIG. 17, illustrating details that may be associated with some embodiments of the temperature sensor of FIG. 17.

FIG. 21 is a detail view, taken at reference FIG. 21 of in FIG. 17, illustrating details that may be associated with some embodiments of the temperature sensor 100 of FIG. 17. As illustrated in FIG. 21, in some examples, substantially all of the temperature sensitive resistor unit 506 of the temperature sensor 100 may be covered by the potting or dielectric material 1702.

Figure 22:
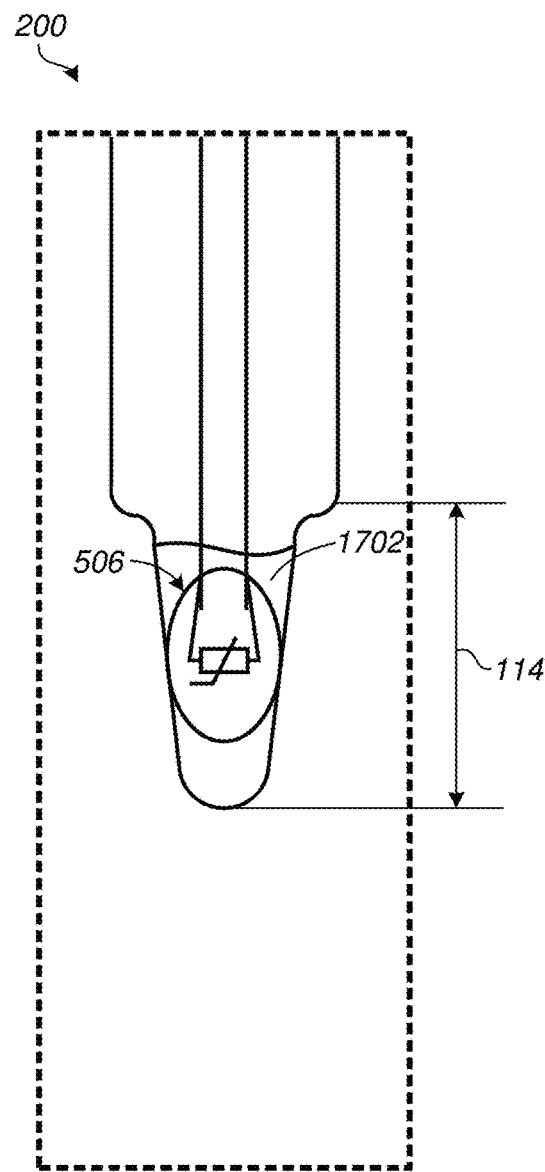
FIG. 22 is a detail view, taken at reference FIG. 22 of in FIG. 18, illustrating details that may be associated with some embodiments of the temperature sensor of FIG. 18.

FIG. 22 is a detail view, taken at reference FIG. 22 of in FIG. 18, illustrating details that may be associated with some embodiments of the temperature sensor 200 of FIG. 18. As illustrated in FIG. 22, in some examples, substantially all of the temperature sensitive resistor unit 506 of the temperature sensor 200 may be covered by the potting or dielectric material 1702.

Figure 23:
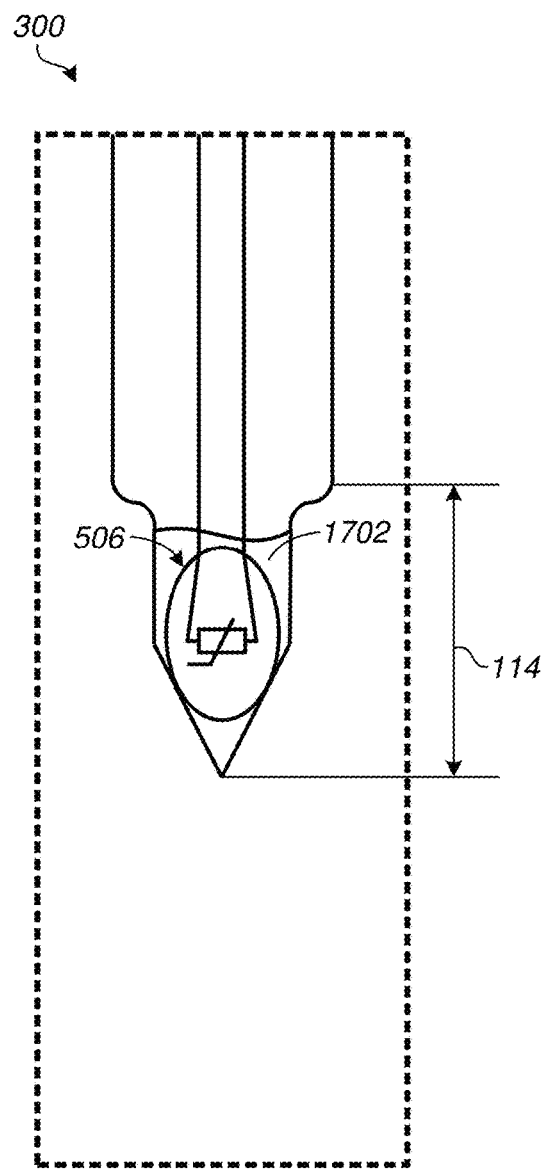
FIG. 23 is a detail view, taken at reference FIG. 23 of in FIG. 19, illustrating details that may be associated with some embodiments of the temperature sensor of FIG. 19.

FIG. 23 is a detail view, taken at reference FIG. 23 of in FIG. 19, illustrating details that may be associated with some embodiments of the temperature sensor 300 of FIG. 19. As illustrated in FIG. 21, in some examples, substantially all of the temperature sensitive resistor unit 506 of the temperature sensor 300 may be covered by the potting or dielectric material 1702.

Figure 24:
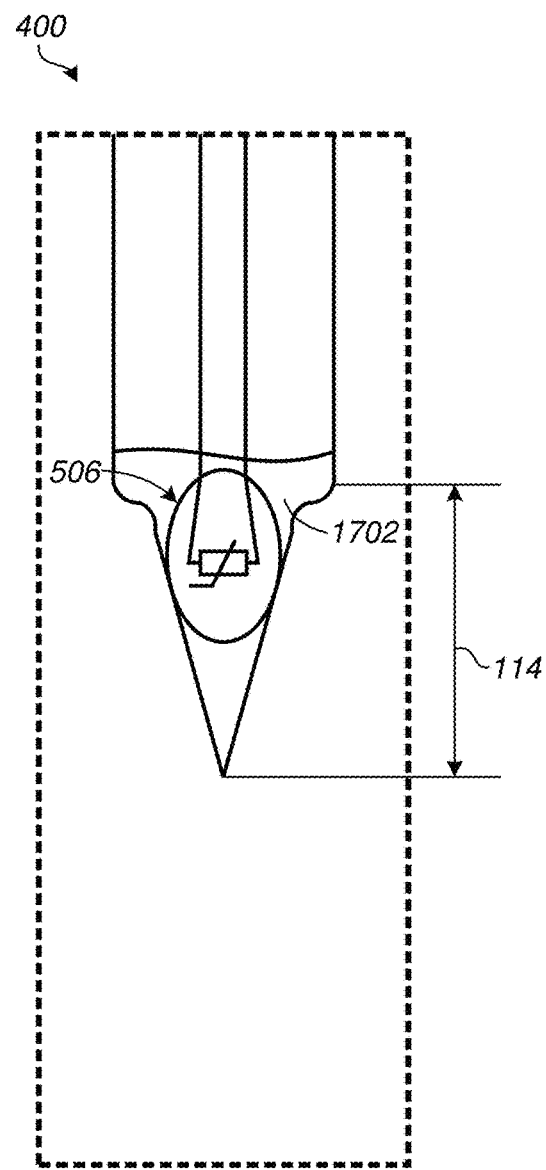
FIG. 24 is a detail view, taken at reference FIG. 24 of in FIG. 20, illustrating details that may be associated with some embodiments of the temperature sensor of FIG. 20.

FIG. 24 is a detail view, taken at reference FIG. 24 of in FIG. 20, illustrating details that may be associated with some embodiments of the temperature sensor 100 of FIG. 20. As illustrated in FIG. 24, in some examples, substantially all of the temperature sensitive resistor unit 506 of the temperature sensor 400 may be covered by the potting or dielectric material 1702.

Figure 25:
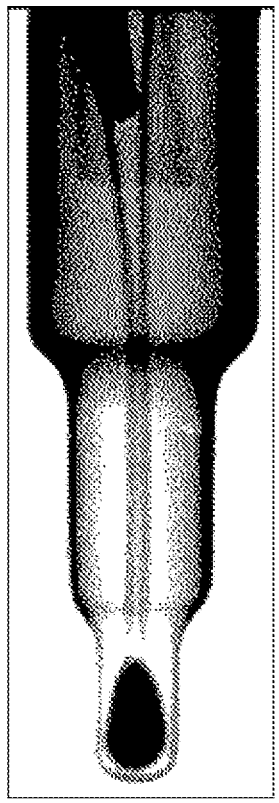
FIG. 25 is an x-ray image of a conventional temperature sensor without a tip portion defining a cone.
Figure 26:
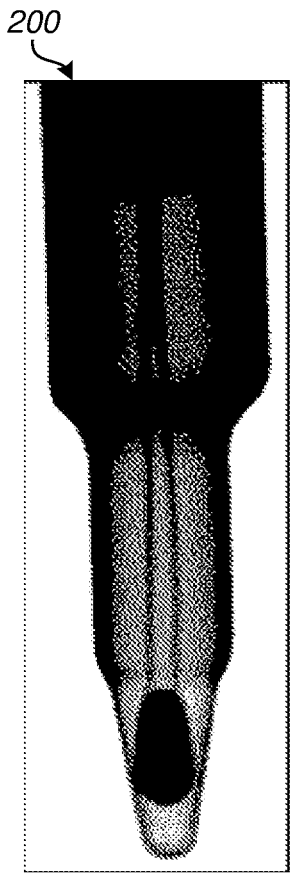
FIG. 26 is an x-ray image of the temperature sensor 200 of FIG. 2.

The systems, apparatuses, and methods described herein may provide significant advantages. For example, FIG. 25 is an x-ray image of a conventional temperature sensor without a tip portion defining a cone. FIG. 26 is an x-ray image of the temperature sensor 200 of FIG. 2. As shown in FIG. 26, by providing a tip portion defining a cone, the number of contact points between the outer surface of the temperature sensitive resistor unit and the interior surface of the portion of the peripheral wall forming the cone of tip portion may be increased, improving the thermal response time of the temperature sensor and improving the overall consistency of temperature measurements, Additionally, by providing a conical structure at the distal end of the housing, assembly time may be reduced. For example, by providing a conical structure with a relatively wider base, the temperature sensitive resistor unit may be more easily received within the tip portion.

While shown in a few illustrative embodiments, a person having ordinary skill in the art will recognize that the systems, apparatuses, and methods described herein are susceptible to various changes and modifications that fall within the scope of the appended claims. Moreover, descriptions of various alternatives using terms such as "or" do not require mutual exclusivity unless clearly required by the context, and the indefinite articles "a" or "an" do not limit the subject to a single instance unless clearly required by the context. Components may be also be combined or eliminated in various configurations for purposes of sale, manufacture, assembly, or use.

The appended claims set forth novel and inventive aspects of the subject matter described above, but the claims may also encompass additional subject matter not specifically recited in detail. For example, certain features, elements, or aspects may be omitted from the claims if not necessary to distinguish the novel and inventive features from what is already known to a person having ordinary skill in the art. Features, elements, and aspects described in the context of some embodiments may also be omitted, combined, or replaced by alternative features serving the same, equivalent, or similar purpose without departing from the scope of the invention defined by the appended claims The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A temperature sensor comprising:
a body made from a thermally and electrically conductive material and defined by a peripheral wall extending along a longitudinal axis from an open proximal end to a closed distal end;
wherein, at the proximal end of the body, the peripheral wall defines an opening to an internal cavity of the body, the internal cavity being bounded by an inner surface of the peripheral wall; and
a temperature responsive element disposed substantially within the internal cavity, the temperature responsive element comprising an outer surface, a temperature sensitive resistor, a first lead, a second lead, and a connector block;
wherein a first end of the first lead is electrically connected to a first side of the connector block and a second end of the first lead is electrically connected to a first side of the resistor;
wherein a first end of the second lead is electrically connected to a second side of the connector block and second end of the second lead is electrically connected to a second side of the resistor;
wherein a continuous electrical circuit is formed between the first side of the connector block to the first lead to the resistor to the second lead to the second side of the connector block;
wherein, at the closed distal end of the body, the inner surface of the peripheral wall comprises the shape of a right circular cone;
wherein the outer surface of the temperature sensitive resistor is in direct contact with at least three points on the inner surface of the peripheral wall at the distal end of the body, wherein at least two of the at least three points are separated by at least 90 degrees as measured along a perimeter of the peripheral wall defined perpendicular to the longitudinal axis; and
wherein one of a thermally conductive and curable potting material and a thermally conductive grease is disposed in the cavity and substantially surrounds the temperature responsive element.

2. The temperature sensor according to claim 1, wherein a cross-section of the cone taken along the longitudinal axis comprises an included angle θ;
wherein $15° \leq \theta \leq 120°$.

3. The temperature sensor according to claim 1, wherein a cross-section of the cone taken along the longitudinal axis comprises an included angle θ;
wherein $30° \leq \theta \leq 90°$.

4. The temperature sensor according to claim 1, wherein an apex angle of the cone (θ) is $15° \leq \theta \leq 120°$.

5. The temperature sensor according to claim 1, wherein an apex angle of the cone (θ) is $30° \leq \theta \leq 90°$.

6. The temperature sensor according to claim 1, wherein a vertex of the cone comprises a radius.

7. The temperature sensor according to claim 1, wherein a vertex of the cone comprises a hemisphere.

8. A temperature sensor comprising:
a body defined by a peripheral wall extending along a longitudinal axis from an open proximal end to a closed distal end;
wherein, at the proximal end of the body, the peripheral wall defines an opening to an internal cavity of the body, the internal cavity being bounded by an inner surface of the peripheral wall; and
a temperature responsive element disposed substantially within the internal cavity, the temperature responsive element comprising an outer surface;
wherein, at the closed distal end of the body, the inner surface of the peripheral wall is a cone;
wherein the outer surface of the temperature responsive element is in direct contact with at least two points on the inner surface of the peripheral wall at the closed distal end of the body; and
wherein the at least two points are separated by at least 90 degrees as measured in a plane perpendicular to the longitudinal axis.

9. The temperature sensor according to claim 8, wherein the cone comprises a right circular cone.

10. The temperature sensor according to claim 8, wherein a cross-section of the cone taken along the longitudinal axis comprises an included angle θ;
wherein $15° \leq \theta \leq 120°$.

11. The temperature sensor according to claim 8, wherein an apex angle of the cone (θ) is $30° \leq \theta \leq 90°$.

12. The temperature sensor according to claim 8, wherein a vertex of the cone comprises a radius.

13. The temperature sensor according to claim 8, wherein vertex of the cone comprises a hemisphere.

14. The temperature sensor according to claim 8, wherein the body comprises an electrically conductive material.

15. The temperature sensor according to claim 8, wherein the body comprises a thermally conductive material and an electrically conductive material.

16. The temperature sensor according to claim 8, wherein the body comprises at least one of steel, aluminum, copper, brass, and stainless steel.

17. The temperature sensor according to claim 8, wherein the temperature responsive element comprises a temperature sensitive resistor, a first lead, a second lead, and a connector block;
wherein a first end of the first lead is electrically connected to a first side of the connector block and a second end of the first lead is electrically connected to a first side of the resistor;
wherein a first end of the second lead is electrically connected to a second side of the connector block and a second end of the second lead is electrically connected to a second side of the resistor; and
wherein a continuous electrical circuit is formed between the first side of the connector block to the first lead to the resistor to the second lead to the second side of the connector block.

18. The temperature sensor according to claim 8, further comprising a thermally conductive and curable potting material disposed in the cavity and substantially surrounding the temperature responsive element.

19. The temperature sensor according to claim 8, further comprising a curable dielectric material disposed in the cavity and substantially surrounding the temperature responsive element.

20. The temperature sensor according to claim 8, further comprising a thermally conductive grease disposed in the cavity and substantially surrounding the temperature responsive element.

\* \* \* \* \*